US012713356B2

(12) United States Patent
Singh et al.

(10) Patent No.: US 12,713,356 B2
(45) Date of Patent: Aug. 18, 2026

(54) MODE IN POWER SAVING MODE (PSM)'S ACTIVE TIME DURATION

(71) Applicant: QUALCOMM Incorporated, San Diego, CA (US)

(72) Inventors: Pravin Singh, Hyderabad (IN); Anshita Agrawal, Allahabad (IN); Raghuveer Ramakrishna Srinivas Tarimala, Hyderabad (IN); Liangchi Hsu, San Diego, CA (US); Hemanth S, Kurnool (IN); Banuprakash Venkatarathnam Uppacharla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 18/547,268

(22) PCT Filed: Apr. 15, 2022

(86) PCT No.: PCT/US2022/071737
§ 371 (c)(1),
(2) Date: Aug. 21, 2023

(87) PCT Pub. No.: WO2022/221871
PCT Pub. Date: Oct. 20, 2022

(65) Prior Publication Data

US 2024/0137871 A1 Apr. 25, 2024
US 2024/0236864 A9 Jul. 11, 2024

(30) Foreign Application Priority Data

Apr. 16, 2021 (IN) ............................ 202141017728

(51) Int. Cl.
*H04W 52/02* (2009.01)
*H04W 68/02* (2009.01)
*H04W 76/28* (2018.01)

(52) U.S. Cl.
CPC ....... *H04W 52/0274* (2013.01); *H04W 68/02* (2013.01); *H04W 76/28* (2018.02)

(58) Field of Classification Search
CPC ......... H04W 52/0274; H04W 52/0216; H04W 68/02; H04W 76/28; Y02D 30/70
See application file for complete search history.

(56) References Cited

U.S. PATENT DOCUMENTS 11,606,752 B1 * 3/2023 Parra .................... H04W 60/04
2019/0069235 A1 * 2/2019 Patil ................ H04W 52/0216

(Continued)

FOREIGN PATENT DOCUMENTS

WO WO-2016148752 A1 9/2016

OTHER PUBLICATIONS

International Search Report and Written Opinion—PCT/US2022/071737—ISA/EPO—Jul. 18, 2022.

(Continued)

*Primary Examiner* — Robert C Scheibel
(74) *Attorney, Agent, or Firm* — Norton Rose Fulbright US LLP

(57) ABSTRACT

This disclosure provides systems, methods, and devices for wireless communication that support enhanced power saving mode (PSM) for an active time duration of a PSM with extended discontinuous reception (eDRX) configuration in a wireless communication system. In one aspect, a user equipment (UE) is configured to enter a deep sleep mode during inactive times of a PSM, and to operate in eDRX mode during the active times of the PSM. Operating in eDRX mode during the active times includes dividing each of the active time durations into at least one eDRX idle period and at least one eDRX paging period. The UE determines whether a set of criteria for implementing a variant of the PSM is met, and when the set of criteria is met, the UE (Continued)

implements the variant of the PSM, which includes powering down the UE to a deep sleep mode at least during eDRX idle periods.

30 Claims, 9 Drawing Sheets

(56) References Cited

U.S. PATENT DOCUMENTS

| | | | | |
|---|---|---|---|---|
| 2020/0296665 | A1* | 9/2020 | Huang | H04W 4/70 |
| 2022/0201522 | A1* | 6/2022 | Tao | H04W 24/08 |
| 2025/0097845 | A1* | 3/2025 | Lin | H04W 52/0235 |

OTHER PUBLICATIONS

Qualcomm Incorporated: "Extended 1-DRX and PSM Coexistence", SA WG2 Meeting #108, S2-150976 (revision of S2-15xxxx), 3rd Generation Partnership Project, Mobile Competence Centre, 650, Route Des Lucioles, F-06921 Sophia-Antipolis Cedex, France, vol. SA WG2, No. Los Cabos, Mexico, Apr. 13, 2015-Apr. 17, 2015 Apr. 7, 2015, XP050962301, pp. 1-3, Retrieved from the Internet: URL: http://www.3gpp.org/ftp/tsg_sa/WG2_Arch/TSGS2_108_Los_Cabos/Docs/.

* cited by examiner

MODE IN POWER SAVING MODE (PSM)'S ACTIVE TIME DURATION

CROSS-REFERENCE TO RELATED APPLICATIONS

This application claims the benefit of India Patent Application No. 202141017728, entitled, "NEW MODE IN POWER SAVING MODE (PSM)'S ACTIVE TIME DURATION," filed on Apr. 16, 2021, which is expressly incorporated by reference herein in its entirety.

TECHNICAL FIELD

Aspects of the present disclosure relate generally to wireless communication systems, and more particularly, to power saving mode (PSM) with extended discontinuous reception (eDRX).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining whether a set of criteria for implementing a variant of a power saving mode (PSM) is met. In aspects, the set of criteria includes a determination of whether PSM is enabled for the UE, a determination that a configuration of the PSM includes an active time having a duration that is longer than a threshold duration, and a determination that the UE is configured to operate in extended discontinuous reception (eDRX) mode during the active time of the PSM. The configuration of the eDRX mode specifies at least one eDRX paging duration and at least one eDRX idle duration for the active time of the PSM. The method also includes implementing, by the UE, the variant of the PSM when the set of criteria is determined to be met. In aspects, implementing the variant of the PSM includes powering down the UE at least during a part of the at least one eDRX idle duration.

In an additional aspect of the disclosure, a UE includes at least one processor and a memory coupled to the at least one processor. The at least one processor stores processor-readable code that, when executed by the at least one processor, is configured to perform operations including determining whether a set of criteria for implementing a variant of a PSM is met. In aspects, the set of criteria includes a determination of whether PSM is enabled for the UE, a determination that a configuration of the PSM includes an active time having a duration that is longer than a threshold duration, and a determination that the UE is configured to operate in eDRX mode during the active time of the PSM. The configuration of the eDRX mode specifies at least one eDRX paging duration and at least one eDRX idle duration for the active time of the PSM. The operations also include implementing, by the UE, the variant of the PSM when the set of criteria is determined to be met. In aspects, implementing the variant of the PSM includes powering down the UE at least during a part of the at least one eDRX idle duration.

In an additional aspect of the disclosure, a base station includes at least one processor and a memory coupled to the at least one processor. The at least one processor stores processor-readable code that, when executed by the at least one processor, is configured to perform operations including determining whether a set of criteria for implementing a variant of a PSM is met. In aspects, the set of criteria includes a determination of whether PSM is enabled for the UE, a determination that a configuration of the PSM includes an active time having a duration that is longer than a threshold duration, and a determination that the UE is configured to operate in eDRX idle mode during the active time of the PSM. The configuration of the eDRX mode specifies at least one eDRX paging duration and at least one eDRX idle duration for the active time of the PSM. The operations also include implementing, by the UE, the variant of the PSM when the set of criteria is determined to be met. In aspects, implementing the variant of the PSM include powering down the UE at least during a part of the at least one eDRX idle duration.

In an additional aspect of the disclosure, an apparatus includes means for determining whether a set of criteria for implementing a variant of a PSM is met. In aspects, the set of criteria includes a determination of whether PSM is enabled for the UE, a determination that a configuration of the PSM includes an active time having a duration that is longer than a threshold duration, and a determination that the UE is configured to operate in eDRX mode during the active time of the PSM. The configuration of the eDRX mode specifies at least one eDRX paging duration and at least one eDRX idle duration for the active time of the PSM. The method also includes implementing, by the UE, the variant of the PSM when the set of criteria is determined to be met. In aspects, the means for implementing the variant of the PSM include means for powering down the UE at least during a part of the at least one eDRX idle duration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
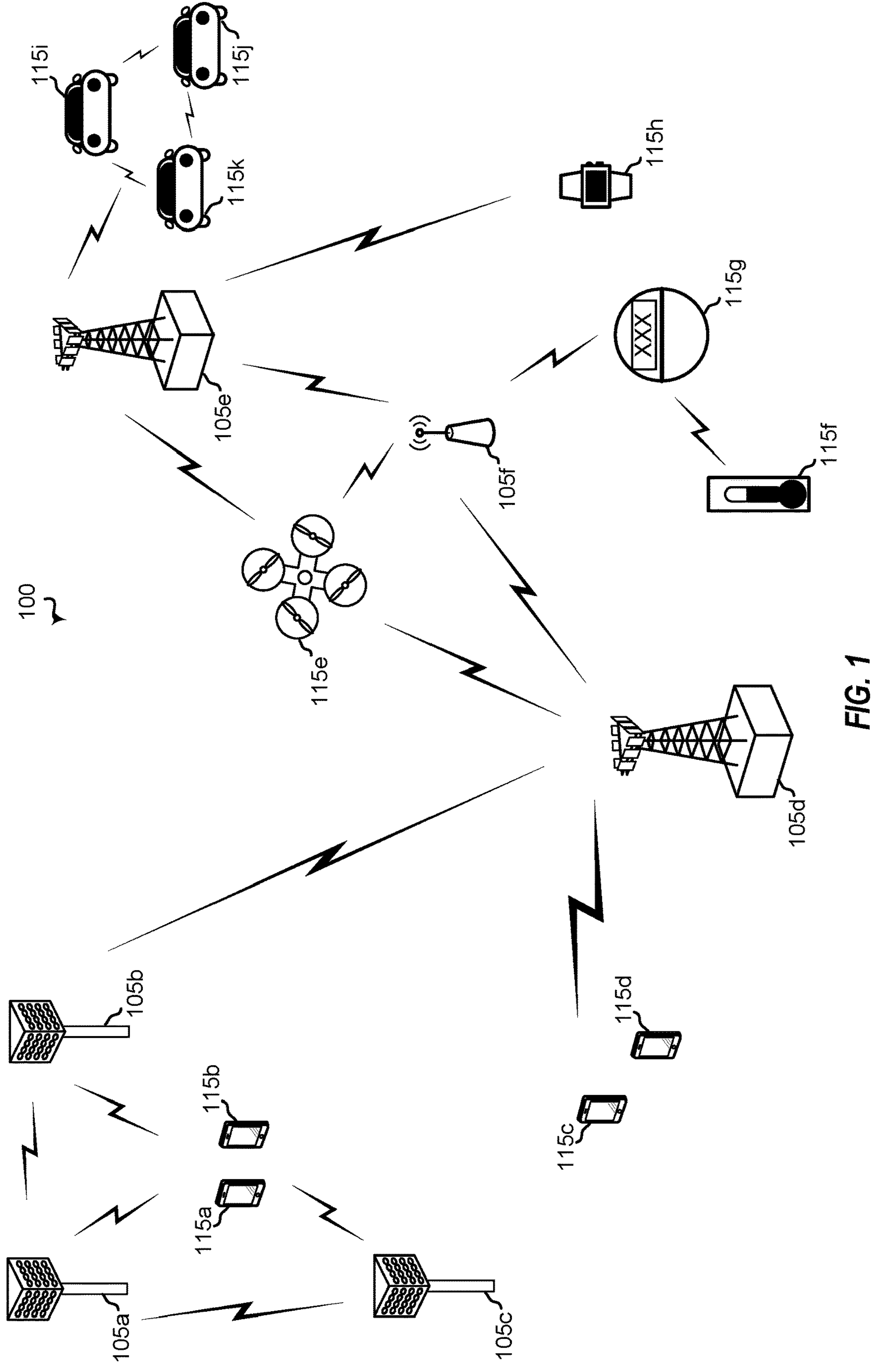
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure relate to techniques that enable an enhanced power saving mode (PSM) for an active time duration of a PSM with extended discontinuous reception (eDRX) configuration in a wireless communication system. In particular aspects of the present disclosure, a user equipment (UE) may be enabled with PSM, where the PSM may include at least one inactive time duration and at least one active time duration. In aspects, the UE may be configured to enter a deep sleep mode during the inactive time durations, and to operate in eDRX mode during the active time durations. Operating in eDRX mode during the active time durations may include dividing each of the active time durations into at least one eDRX idle period and at least one eDRX paging period that includes a paging time window (PTW). In aspects, the UE may determine whether a set of criteria for implementing a variant of the PSM is met. When the set of criteria is determined to be met, the UE may implement the variant of the PSM, which may include powering down the UE to a deep sleep mode at least during eDRX idle periods, and powering up the UE at least during the PTWs. By providing techniques that enable the enhanced PSM for an active time duration of a PSM with eDRX configuration, in which the UE is in deep sleep mode during the eDRX idle periods of the active time durations of the PSM cycle, aspects of the present disclosure provide a process that addresses the limitations of system that implement a combination of PSM and eDRX, and allows such systems to reduce the power consumption, which results in an increased battery life.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5GNR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

In aspects a network entity, network node, network equipment, mobility element of wireless network 100, etc., may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC, etc. In aspects, a network entity may include or may be a base station.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
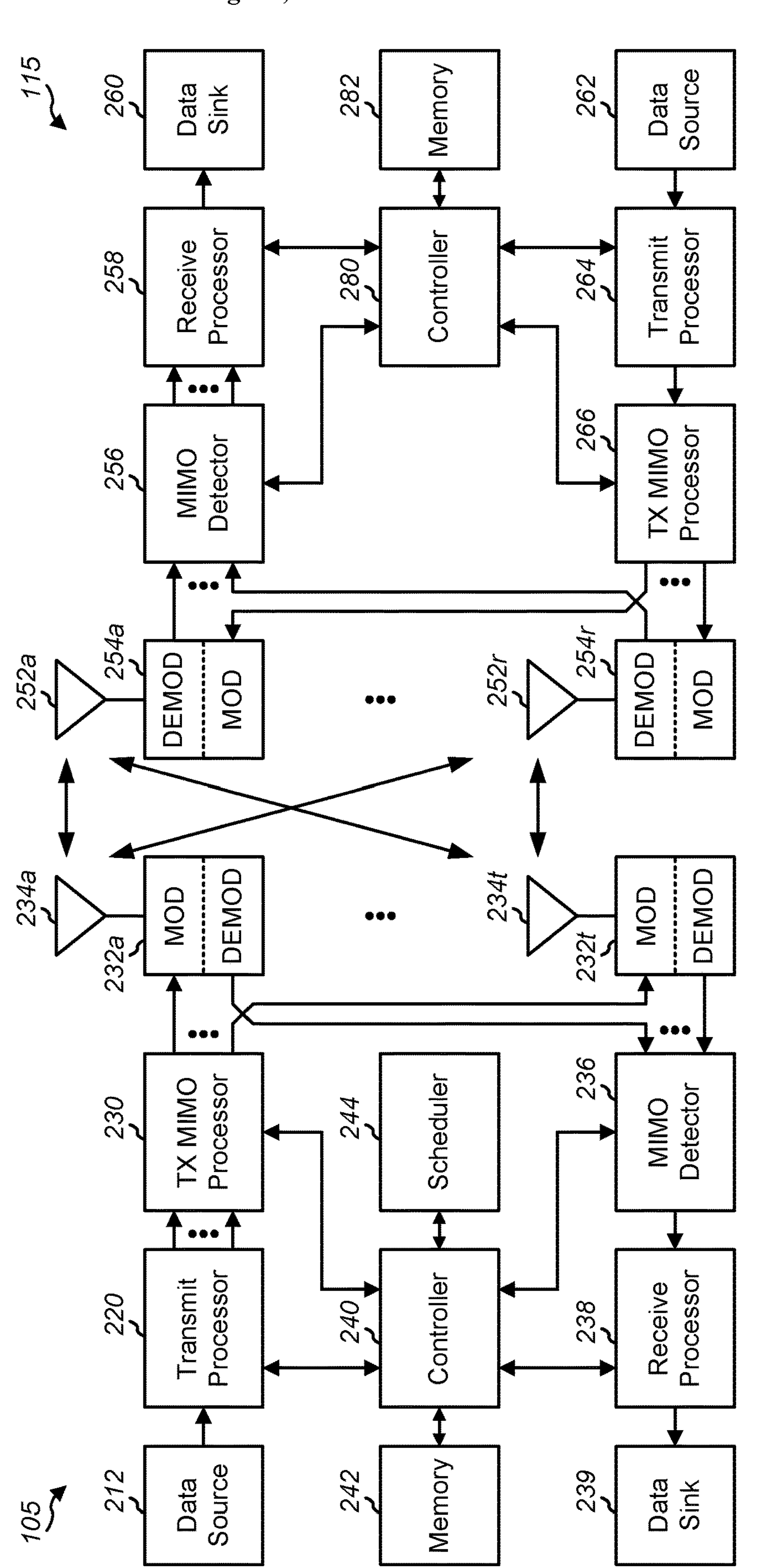
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Power savings is an important aspect of wireless device implementations, but it is a particularly important concept with respect to wireless devices with reduced capabilities. Some wireless devices may be configured with a smaller or lower form factor than other regular devices, and may be designed with power sources with limited capabilities (e.g., smaller batteries). Still some devices (e.g., IoT devices) may be designed or required to operate for years with the same power source. In these devices, power management is especially important. Some of these devices may include reduced capabilities (RedCap) UEs, which may be devices that have or are configured with limited capabilities when compared with a normal UE. RedCap UEs may include wearable device (e.g. smart watches, etc.), industrial wireless sensor networks (IWSN), surveillance cameras, IoT devices, sensors, low-end smartphones, etc.

Some current implementations of wireless communication systems implement various features for power savings in wireless devices. One feature that is used for power savings is referred to as power saving mode (PSM). In PSM, a wireless device may be active (e.g., fully powered on) only when the wireless device has data to transmit, or during periodic intervals after the expiration of a configurable timer. At other times, the wireless device may be powered down. Powering down the wireless device may include shutting down the modem and/or applications processor of the wireless device, and/or shutting down other circuitry. Because the wireless device is not active (or powered on) all the time, the power consumed by the wireless device may be reduced, and the battery power may be increased, with respect to implementations without PSM.

In a typical PSM implementation, a PSM cycle may include an inactive time and an active time. A UE is configured to be active to communicate with a base station only during intermittent (and sometimes periodic) intervals (e.g., active times). When the UE is not active for communication with the base station, the UE is powered down (e.g., during the inactive times). As used herein, powering down a UE may include shutting down the modem and/or application(s) processor(s) of the UE, and/or shutting down most other circuitry of the UE and leaving powered up only that circuitry configured to maintain a capability for the UE to be able to power up again at an assigned time (e.g., active time) or when the UE determines that it has data to transmit to a base station. A powered down UE may also be referred to as a UE in deep sleep mode or a UE in PSM.

In typical PSM implementations, two timers define the PSM operation. One of such timers is the tracking area update (TAU) timer, also referred to as a T3412 timer. The TAU timer generally defines the inactive time of the PSM cycle. As such, the UE shuts down for a duration of time defined by the TAU timer. Upon the expiration of the TAU timer, the UE wakes up to notify the availability of the UE to the network, and/or to send or transmit data to the network. The other timer defining the PSM operation is the active timer, also referred to as a T3324 timer. The active timer defines a duration that the UE is to remain in idle mode (e.g., a radio resource control (RRC) idle mode) during the active time of the PSM cycle after the UE has transmitted data to the base station and the base station has issued a release (e.g., RRC release) message. For example, after the UE wakes up (e.g., after expiration of the TAU timer), the UE may transmit data to a base station. After transmitting the data, the UE may transition into an RRC idle state. The UE may stay in the RRC idle state (e.g., monitoring for pages from the base station) for a duration equal to the active timer duration. Upon expiration of the active timer, the UE transitions into the PSM inactive cycle and start the TAU timer to execute another PSM cycle.

Figure 3A:
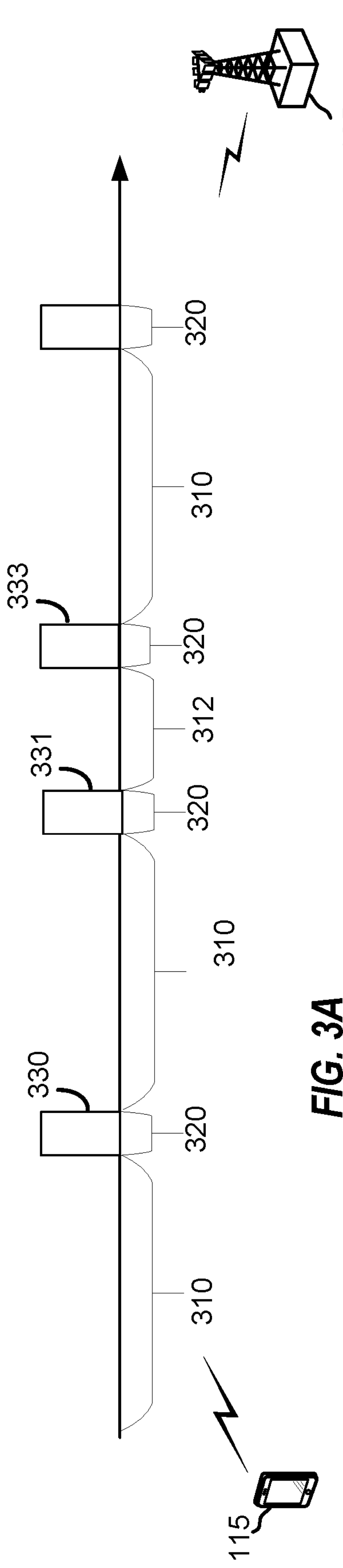
FIG. 3A, shows a diagram illustrating an example of a current power saving mode (PSM) implementation of a UE.
Figure 3B:
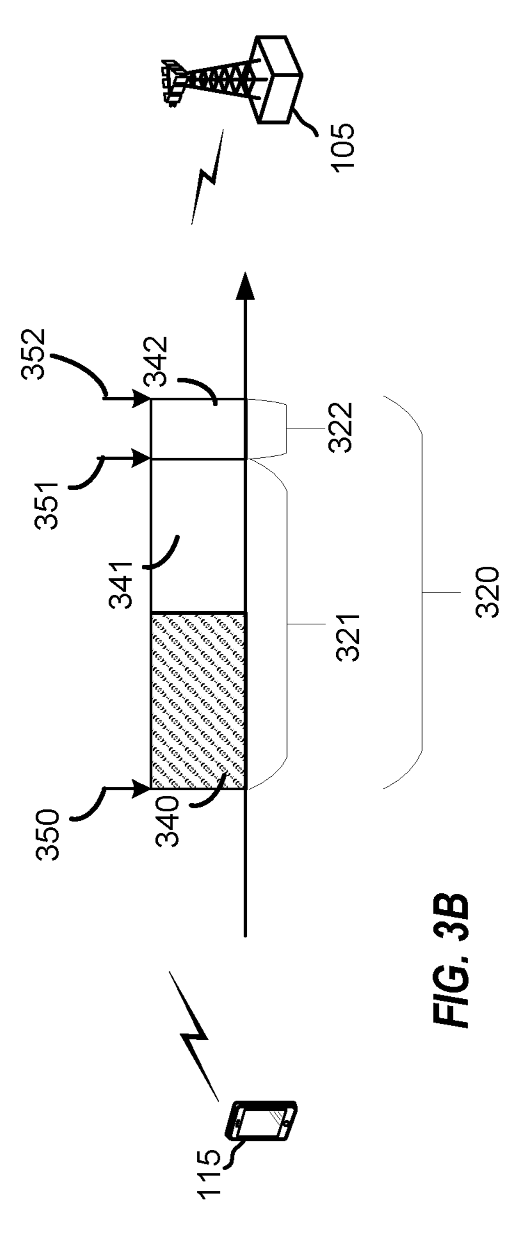
FIG. 3B shows a diagram illustrating an example of an active time duration of a PSM cycle.

FIGS. 3A and 3B are diagrams illustrating an example of a current PSM implementation. In particular, FIG. 3A, shows a diagram illustrating an example of a current PSM implementation of a UE. As shown in FIG. 3A, a PSM cycle of UE 115's PSM implementation may include an inactive time of inactive duration 310 and an active time of active duration 320. In implementations, the inactive duration 310 may be defined by a TAU timer configured by base station 105 for UE 115, and may be in the order of minutes or hours (e.g., in this example 7 hours). During the PSM cycle, UE 115 may be inactive (e.g., shutdown or power down) during the inactive duration 310. Upon the expiration of inactive duration 310, UE 115 may enter an active time (e.g., active time 330 and 331) of the PSM cycle. In the example illustrated in FIG. 3A, the duration of the active time is active duration 320, and active duration 320 may be in the order of seconds, minutes, or even hours. As mentioned above, during the active duration 320, UE 115 may be powered up (e.g., fully powered up) in order to communicate with base station 105 during the active time (e.g., in RRC connected mode and/or in RRC idle mode). In aspects, after the end of active duration 320, UE 115 may transition back to the inactive time and may remain in the inactive time for another inactive duration 310.

In some implementations, UE 115 may not wait until the TAU timer expires to enter the active time. For example, after active time 331, UE 115 may enter inactive duration 312. Although a TAU timer may be initiated when 115 enters inactive duration 312, UE 115 may have mobile-originated (e.g., uplink) data to transmit to base station 105 before the expiration of the TAU timer. In this case, rather than waiting for the expiration of the TAU timer, UE 115 may enter active time 333, for active duration 320, before the expiration of the TAU timer. In this case, UE 115 may enter the inactive time again and may remain in the inactive time for another inactive duration 310 until the expiration of the TAU timer.

FIG. 3B shows a diagram illustrating an example of an active time of a PSM cycle. It is noted that the example illustrated in FIG. 3B is an example of an active time, such as one of active times 330, 331, or 333 of FIG. 3A. As shown in FIG. 3B, a UE may exit the inactive time of the PSM cycle and enter the active time of the PSM cycle at time 350. In this example, UE 115 may exit the PSM inactive time and enter the active time in response to the TAU timer expiration, or in response to MO data to be transmitted to base station 105. In any case, at time 350, UE 115 may be fully powered up and may establish a connection with base station 105 and may enter an RRC connected mode with base station 105 for a period 321. During the RRC connection 321, UE 115 may transmit data to base station 105 during period 340. After the data has been transmitted to base station 105 during 340, UE 115 may begin a period of inactivity 341. Base station 105 may begin an inactivity timer during period 341, monitoring for further transmissions from UE 115. Upon the expiration of the inactivity timer (e.g., at time 351), base station 105 may transmit an RRC release message to UE 115. UE 115 may receive the RRC release message at time 351 and may transition into RRC idle mode and, concurrently, may start an active timer. During the RRC idle mode, UE 115 may remain powered on, but may monitor for paging messages from base station 105. In implementations, the duration of the active timer may be configured by base station 105. UE 115 may remain in RRC idle mode for duration 322, until the expiration of the active timer at time 352. At time 352, in response to the expiration of the active timer, UE 115 enters an inactivity time of the PSM cycle and shuts down.

In current implementations of wireless communication systems, active timers (e.g., the T3324 timers) during which the UE is powered up may have a duration that ranges from 0 to 31 seconds, minutes, or decihours. As such, the duration of the active timers (and thus the duration of the active time of a PSM cycle) may vary considerably. However, as noted above, during the active time of a PSM cycle, the UE remains powered up, monitoring for paging messages from the base station. As such, the power consumed during the active time of the PSM cycle, even when it is in idle mode, is considerable.

As more and more RedCap devices are deployed in wireless communication systems, PSM, and PSM with discontinuous reception (DRX) as discussed below, is becoming more widely implemented. However, in order to support the scheduling of a vast number of devices, network operators are increasing the active time of the PSM cycle significantly. As noted above, in some implementations, the active time of the PSM cycle may be 60 mins or more.

In implementations, the PSM mechanism for power savings is combined with another feature that is used for power savings. This other feature is referred to as DRX. In DRX, a wireless device enters a low power mode or sleep mode at certain intervals and stops monitoring a downlink channel for messages from a base station during the low power mode. Typically, a UE may be in one of RRC operating modes, which include the RRC connected mode in which the UE transmits and receives data over an established connection with the base station, and the RRC idle mode in which no established connection between the UE and the base station exists, but the UE monitors a downlink channel for paging messages from the base station. As noted above, in DRX mode, the UE in RRC idle mode does not monitor the downlink channel at all times, but rather only monitors the downlink channel during a defined paging interval within the DRX cycle. During the defined paging interval, the UE is powered up and monitors for a paging message from the base station. During time intervals other than the defined time interval, the UE in DRX mode enters the low power mode or sleep mode, in which the UE powers down some of its circuitry. In implementations, the paging intervals within the DRX cycles occur at periodic intervals or paging cycles. In legacy implementations of DRX, the paging cycle may be in the order of a few seconds (e.g., <2.56 seconds). As such in legacy implementations, in RRC idle mode, a UE operating in DRX may wake up from low power mode every few seconds to monitor for a paging message. In newer implementations of DRX, an extended DRX (eDRX) mechanism is provided in which the paging cycle is extended to a duration in the order of up to minutes and even hours. In eDRX implementations, a paging time window (PTW) is provided within the eDRX cycle during which a UE may exit low power mode and monitor for a paging message from the base station. During times outside of the PTW, the UE in eDRX mode may enter the low power mode.

It is noted that the present description focuses on examples utilizing DRX, but it will be appreciated that the same functionality may be provided using eDRX. As such, in the present disclosure, DRX and eDRX may be interchanged.

In implementations combining PSM and eDRX, a UE may be in deep sleep mode (or PSM) during inactive times of a PSM cycle, and may wake up from the deep sleep during active times of the PSM cycle. During the active times of the PSM cycle, the UE may be in eDRX mode, in which the active time of the PSM cycle may be divided into one or more eDRX idle durations and one or more eDRX paging durations. The eDRX idle durations of the active time may be periods of time during which the UE enters an eDRX low power or sleep mode, and the eDRX paging durations may include a PTW during which the UE is operable to monitor a downlink channel for paging messages from a base station.

Figure 3C:
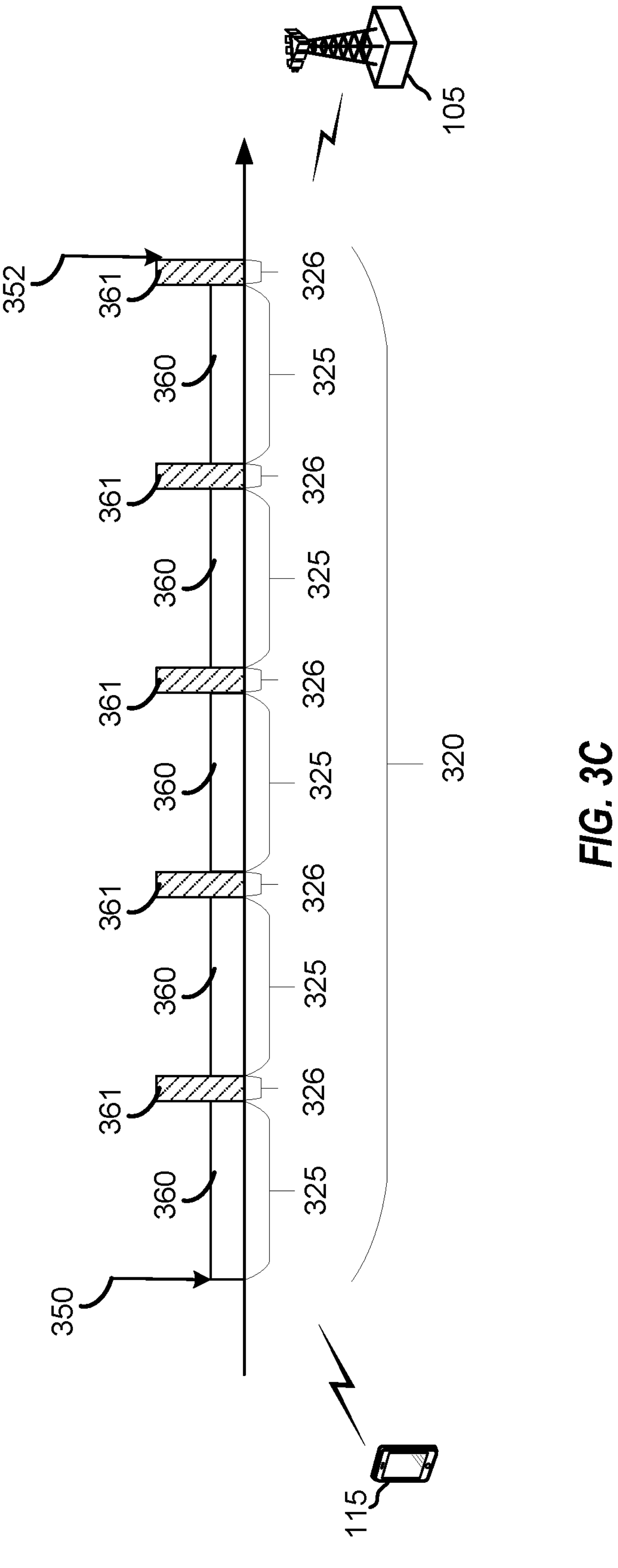
FIG. 3C shows a diagram illustrating an example of an extended discontinuous reception (eDRX) configuration of an active time of a PSM cycle.

FIG. 3C shows a diagram illustrating an example of an eDRX configuration of an active time of a PSM cycle. In particular, active time 320 shown in FIG. 3C may be an active time such as one of active times 330, 331, or 333 of the PSM implementation illustrated in FIG. 3A. As such, the example illustrated in FIG. 3C represents an example of an implementation in which eDRX and PSM are combined. In this example, UE 115 may be in deep sleep mode for the inactive time duration, which may be in the order of several hours, and may wake up periodically, after the expiration of the TAU timer, or may wake up when there is data to be sent to base station 105, and stay in active for a duration of the active time of the PSM cycle. In the example shown in FIG. 3C, active time 320 may be in the order of hours, such as one hour or more. For illustrative purposes, active time 320 may have a duration of one hour. Thus, as shown in FIG. 3C, UE 115 may exit the inactive time of the PSM cycle and enter the active time of the PSM cycle at time 350. In this example, UE 115 may exit the PSM inactive time and enter the active time in response to expiration of the TAU timer, or in response to MO data to be transmitted to base station 105. In any case, at time 350, UE 115 may enter eDRX mode in active time 320. In the eDRX mode, active time 320 may be divided into eDRX idle intervals 360 of duration 325 and eDRX paging intervals 361 of duration 326. In particular, active time 320, which in this example has a duration of one hour, may be divided into five eDRX idle intervals 360 and five eDRX paging intervals 361. Each eDRX paging interval 361 may comprise a PTW during which UE 115 is operable to monitor a downlink channel for paging messages from base station 105. In this example, eDRX intervals 360 may each have a duration of 11:55 minutes, and each of eDRX paging intervals 361 may each have a duration of 5 seconds. As such, during active time 320, UE 115 may remain in low power or sleep mode during eDRX idle intervals 360, which total 59:35 minutes of the 60 minutes duration of the active time 320, and may only be active during a total of 25 seconds, which is the sum of the five eDRX paging intervals 361.

As such, in the example illustrated in FIG. 3C, UE 115 may wake up every 6 hours (or depending on the configuration of the TAU timer, which in this example is 7 hours) and may stay active (e.g., may remain in RRC idle state and/or available for paging) for one hour (e.g., the duration of active time 320) every time UE 115 wakes up (e.g., 3 times for every 24 hours in this example). Accordingly, UE 115 may be in deep sleep mode (or PSM) the remaining 21 hours of the day. Within the duration of active time 320 (e.g., when active timer T3324 is running, which is one hour in the illustrated example), UE 115 may receive a page every 12 minutes (e.g., based on the eDRX configuration of active time 320 in which the eDRX idle duration is 11:55 minutes and the PTW duration is 5 seconds). Therefore, in this example, the base station 105 may page UE 115 up to five times within active time 320.

It is noted that, with respect to power consumption, the low power mode or sleep mode in eDRX is a mode in which the power consumption, although lower than a fully powered up UE, is still greater than the power consumption of a UE in the inactive time of a PSM cycle. In some example, a PSM implementation may consume power at the microampere level when the device is in the deep sleep mode, whereas an eDRX implementation may consume power at the range or level of milliampere and microampere. As such, it will be appreciated that as the active time of the PSM cycle increases in duration, the power consumption of the UE increases significantly, and the battery life of the UE is consequently significantly reduced, because the power consumption during eDRX of the active time is orders of magnitude greater than the power consumption during an inactive time of the PSM cycle. Because of the foregoing, a large active time of a PSM cycle somewhat defeats the originally expected benefits of the PSM feature.

Figure 4:
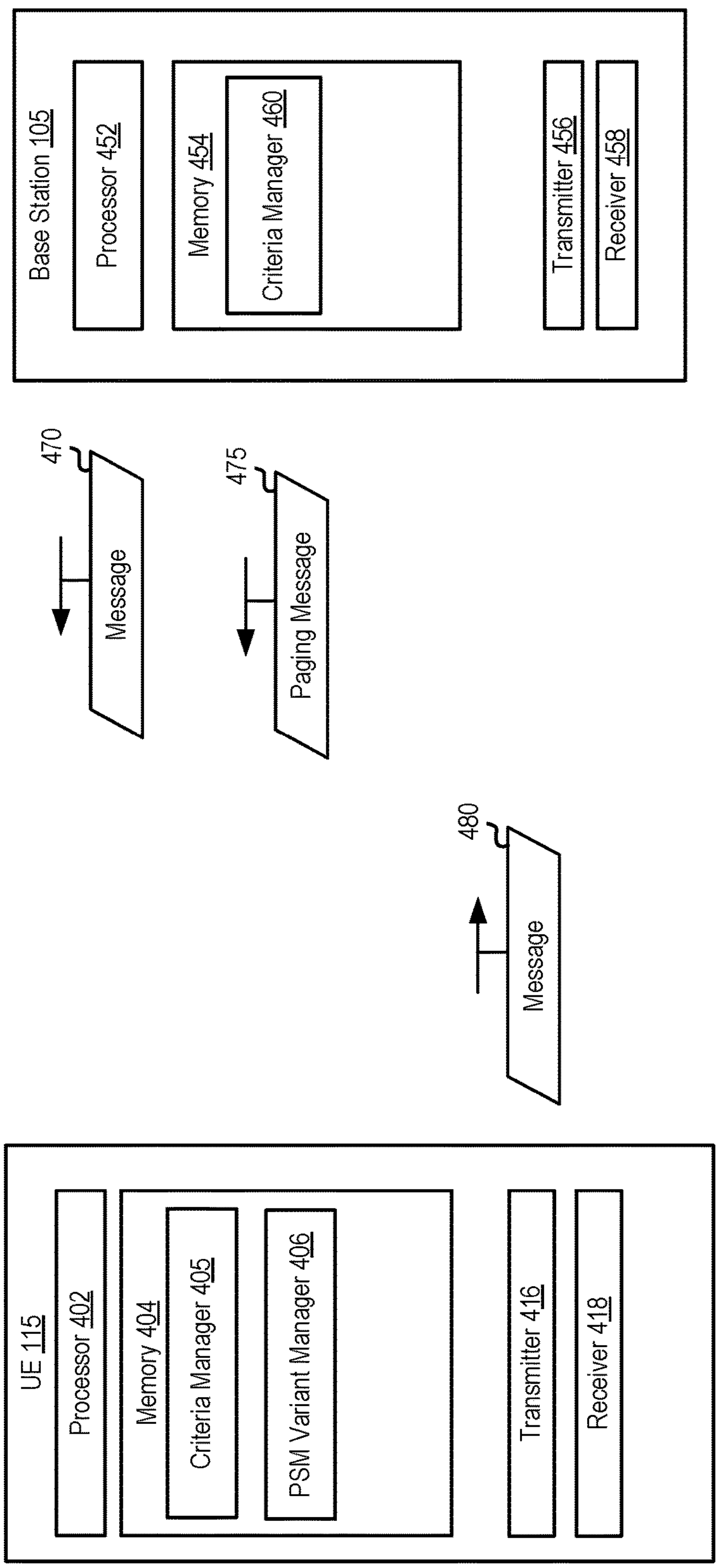
FIG. 4 is a block diagram of an example wireless communications system that supports an enhanced PSM for an active time duration of a PSM with eDRX configuration in a wireless communication system according to one or more aspects of the present disclosure.
Figure 4:

FIG. 4 is a block diagram of an example wireless communications system 400 that supports an enhanced PSM for an active time duration of a PSM with eDRX configuration in a wireless communication system according to one or more aspects of the present disclosure. In particular aspects of the present disclosure, a UE may be enabled with PSM, where the PSM may include at least one inactive time duration and at least one active time duration. In aspects, the UE may be configured to enter a deep sleep mode during the inactive time durations, and to operate in eDRX mode during the active time durations. Operating in eDRX mode during the active time durations may include dividing each of the active time durations into at least one eDRX idle period and at least one eDRX paging period that includes a PTW. In aspects, the UE may determine whether a set of criteria for implementing a variant of the PSM is met. When the set of criteria is determined to be met, the UE may implement the variant of the PSM, which may include powering down the UE to a deep sleep mode at least during eDRX idle periods, and powering up the UE at least during the PTWs. By providing techniques that enable the enhanced PSM for an active time duration of a PSM with eDRX configuration, in which the UE is in deep sleep mode during the eDRX idle periods of the active time durations of the PSM cycle, aspects of the present disclosure provide a process that addresses the limitations of system that implement a combination of PSM and eDRX, and allows such systems to reduce the power consumption, which results in an increased battery life.

In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store criteria manager 405 and PSM variant manager 406. In aspects, criteria manager 405 is configured to perform operations to determine whether a set of criteria for implementing a variant of the PSM has been met. In aspects, the set of criteria may include one or more criteria including a determination of whether PSM is enabled for the UE, a determination that the PSM includes an active time having a duration that is longer than a threshold duration, and/or a determination that the UE is configured to operate in eDRX mode during the active time of the PSM. In aspects, configuration of the eDRX mode specifies a eDRX paging duration and a eDRX idle duration during the active time of the PSM. In aspects, PSM variant manager 406 is configured to perform operations to implement the variant of the PSM when the set of criteria is determined to be met. In aspects, variant manager 406 implements the variant of the PSM by performing operations to cause the UE to power down (e.g., into a deep sleep mode) during least during the eDRX idle duration of the active time.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store criteria manager 460. In aspects, criteria manager 460 is configured to perform operations to determine whether a set of criteria for implementing a variant of the PSM by a UE (e.g., 115) has been met. In aspects, the set of criteria may include one or more criteria including a determination of whether PSM is enabled for the UE, a determination that the PSM includes an active time having a duration that is longer than a threshold duration, and/or a determination that the UE is configured to operate in eDRX mode during the active time of the PSM. In aspects, base station 105 may define a configuration of the eDRX mode of the active time of the PSM implemented by the UE that specifies an eDRX paging duration and a eDRX idle duration during the active time of the PSM.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, base station optionally transmits message 470, including enhanced PSM information, to UE 115. In aspects, enhanced PSM information in message 470 may include configuration information for UE 115. The configuration information may include PSM configuration and/or eDRX configuration. In other aspects, the PSM configuration and/or eDRX configuration may be obtained, by UE 115, in another manner. For example, in some aspects, the PSM configuration and/or eDRX configuration may be predetermined and UE 115 may be preconfigured with the PSM configuration and/or eDRX configuration. In other aspects, UE 115 may negotiate the PSM configuration and/or eDRX configuration with base station 105. For example, UE 115 may transmit an uplink message specifying desired parameters for the PSM configuration and/or eDRX configuration (e.g., interval durations, timer durations, number of cycles, number of intervals, etc.) to base station 105. Base station 105 may then consider the desired parameters provided by UE 115 and may either accept some or all values, or may deny all or some of the desired parameters. In either case, base station 105 may transmit an indication of the decision to the UE.

In aspects, UE 115 may use the obtained PSM configuration to configure a PSM implementation. For example, in aspects, UE 115 may enable PSM based on an indication in the PSM configuration information to enable PSM for UE 115. As discussed above, the PSM implementation of UE 115 may include at least one PSM cycle that includes at least one inactive time, during which UE 115 enters and remains in a deep sleep mode, and at least one active time, during which UE 115 exits the deep sleep mode and enters an active state (e.g., an RRC idle state). This is similar to the inactive time and inactive time discussed above with respect to the FIG. 3A.

In aspects, UE 115 may configure the duration of the TAU timer (e.g., the periodic T3412 timer) based on the obtained PSM configuration, and may configure the duration of the inactive time of the PSM cycles to equal the TAU timer's duration. For example, UE 115 may determine that the inactive time of the PSM cycles may terminate at the expiration of the TAU timer. Similarly, UE 115 may configure the duration of an active timer (e.g., a T3324 timer) based on the obtained PSM configuration, and may configure the active time of the PSM cycles to equal the duration of the active timer's duration. For example, UE 115 may determine that the active time of the PSM cycles may terminate at the expiration of the active timer.

In aspects, UE 115 may use the eDRX configuration to configure the eDRX mode of the active time of the PSM cycles. As discussed above, the active time of the PSM cycles may be configured to operate in eDRX mode. Put another way, UE 115 may be configured to operate in eDRX mode during the active time of the PSM cycles of the PSM implementations. In these aspects, as UE 115 exits the inactivity time of a PSM cycle and enters the active time of the PSM cycle, UE 115 may begin operations in eDRX mode during the active time. In aspects, operations in eDRX mode may include entering a low power mode or sleep mode during eDRX idle periods of the active time, and operating in full powered idle mode to monitor for pages from base station 105 during eDRX paging periods of the active time. In aspects, UE 115 may configure the eDRX mode of the active time of the PSM cycles using the eDRX configuration. For example, UE 115 may configure the number and/or duration of each eDRX idle period of the active time, and the number and/or duration of each eDRX paging period of the active time based on the eDRX configuration.

In aspects, UE 115 may be configured to determine whether a set of criteria for implementing a variant of the PSM has been met. In aspects, UE 115 may make the determination based on the PSM and eDRX configurations, or based on an indication received from base station 105 that the set of criteria for implementing the variant of the PSM has been met. In the latter case, UE 115 may receive the indication in the configuration information in message 470, or may receive the indication in a separate downlink message.

In aspects, the set of criteria for implementing a variant of the PSM may include one or more criteria including a determination of whether PSM is enabled for the UE. For example, as discussed above UE 115 may be configured to enable PSM (e.g., by base station 105, another network node, or by predetermined configuration). In these aspects, thus, implementing the variant of the PSM may be performed by UE 115 only when PSM has been enabled for UE 115.

In aspects, the set of criteria for implementing a variant of the PSM may also include a determination that the PSM configuration includes an active time having a duration that is longer than a threshold duration. In these aspects, implementing the variant of the PSM may be performed by UE 115 only when the duration of the active time of the PSM cycles is longer than the threshold duration. For example, the PSM configuration for UE 115 may include a duration for the active time of the PSM cycles to be a value $X_{active}$, which in some aspects may be in the order of minutes and/or hours. In aspects, $X_{active}$ may be compared to the threshold duration. When $X_{active}$ is determined to equal to or less than the threshold duration, UE 115 may determine not to implement the variant of the PSM. However, when $X_{active}$ is determined to be greater, or longer, than the threshold duration, UE 115 may determine to implement the variant of the PSM. In aspects, the threshold duration may be a predetermined value, and/or may be configured by base station 105. In aspects, the threshold duration may be in the order of minutes and/or hours. The variant of the PSM allows an optimization that is enabled when the active timer T3324 and the eDRX cycle length are greater than an implementation specified threshold values, in consideration of power overheads due to power off/on procedures. For example, in aspects, the threshold duration may be a value that is longer or greater than an overhead duration required to power up the UE. For example, there may be an overhead cost when transitioning from the deep sleep mode to the RRC idle state. In aspects, UE 115 may determine to implement the variant of the PSM only when the duration of the active time is greater than the overhead, as when the active time is less than the overhead, there are no power savings to be obtained.

In aspects, the set of criteria for implementing a variant of the PSM may also include a determination that the UE is configured to operate in eDRX mode during the active time of the PSM cycles. For example, as discussed above UE 115 may be configured to operate in eDRX mode during the active time of the PSM cycles. In these aspects, thus, implementing the variant of the PSM may be performed by UE 115 only when UE 115 determines that UE 115 operates in eDRX mode during the active time of the PSM cycles. As noted above, the eDRX configuration of the active time of the PSM cycles may specify that the active time of the PSM cycles is divided into one or more eDRX idle period of a certain duration, and one or more eDRX paging periods of certain duration. UE 115 may be configured to operate to monitor for paging messages from base station 102 during the one or more eDRX paging periods of the active time of the PSM cycles. In aspects, UE 115 may operate to monitor for paging messages during the one or more eDRX paging periods by operating in full idle power during the eDRX paging periods of the active time of the PSM cycles.

In aspects, UE 115 may be configured to implement the variant of the PSM when the set of criteria is determined to be met. For example, when one or more of the criteria in the set of criteria is met, or in some aspects when all of the criteria in the set of criteria is met, UE 115 may implement the variant of the PSM. In aspects, implementing the variant of the PSM may include powering down UE 115 into a deep sleep mode during the eDRX idle period of the active time of the PSM cycles. As noted above, the deep sleep mode of the variant of the PSM is a lower power mode than the sleep mode of the typical eDRX idle period of the normal PSM. In aspects, the variant of the PSM may be implemented for the duration of the eDRX cycle (e.g., while the timer T3324 is active, and where UE 115 may be in the idle eDRX state).

In aspects, when the set of criteria is not determined to be met, UE 115 may determine not to implement the variant of the PSM. In aspects, UE 115 may determine not to implement the variant of the PSM by instead implementing a normal PSM during the active time of the PSM cycles. In the normal PSM, UE 115 may enter low power or sleep mode during the eDRX idle periods of the active time of the PSM cycles, and may exit the low power or sleep mode during eDRX paging periods of the active time of the PSM cycles.

Figure 5A:
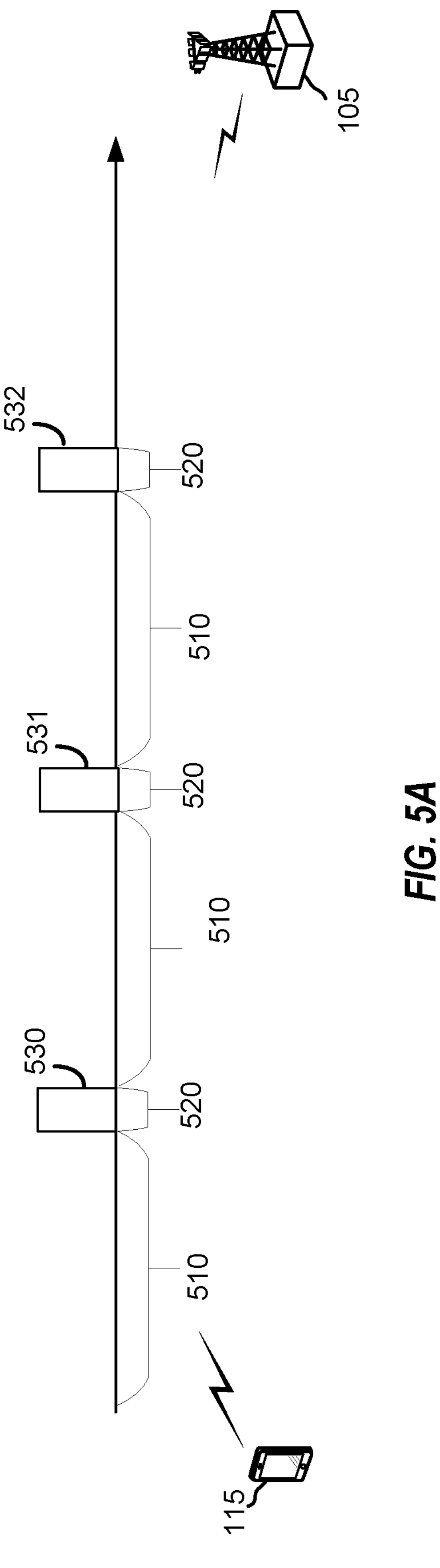
FIG. 5A shows a diagram illustrating an example of a PSM implementation in accordance with aspects of the present disclosure.
Figure 5B:
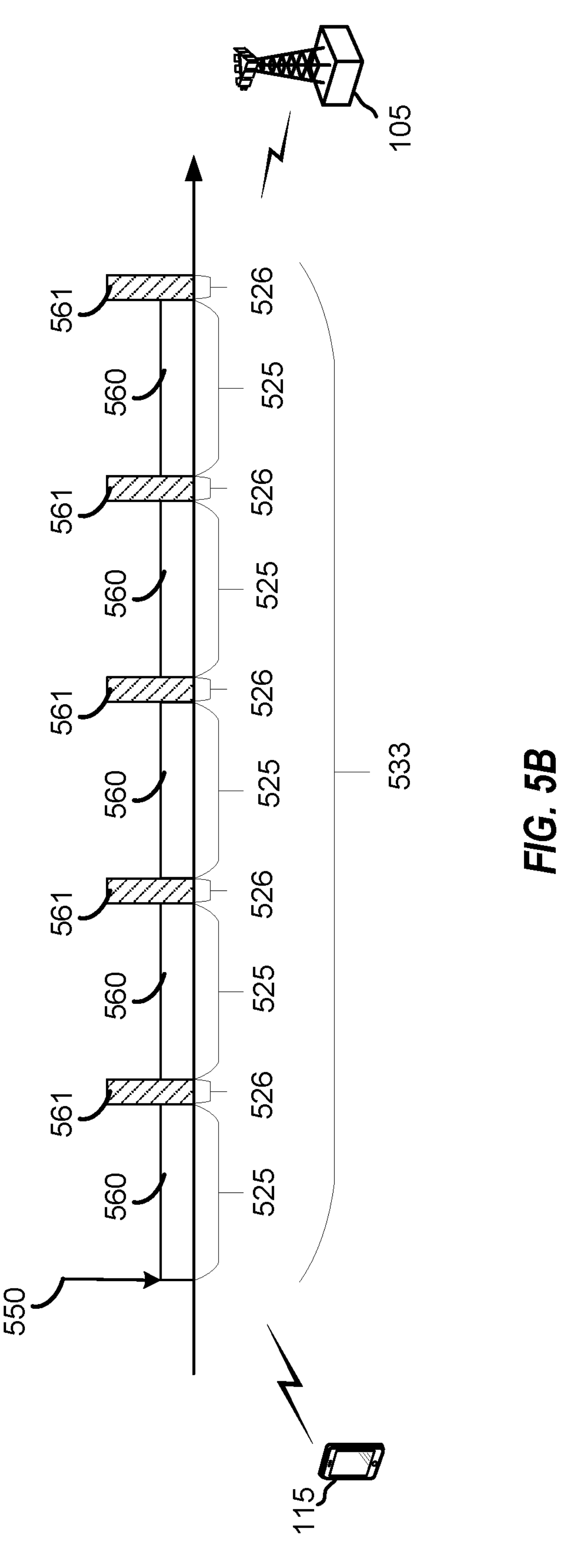
FIG. 5B shows a diagram illustrating an example of a variant of a PSM implementation for an active time of a PSM cycle configured for eDRX in accordance with aspects of the present disclosure.

FIGS. 5A and 5B show diagrams illustrating an example of a variant of a PSM implementation in accordance with aspects of the present disclosure. In particular, FIG. 5A shows a diagram illustrating an example of a PSM implementation in accordance with aspects of the present disclosure. As shown in FIG. 5A, each PSM cycle of UE 115's PSM implementation may include an inactive time (e.g., an inactive time of duration 510) and an active time (e.g., active times 530-532) of duration 520. In aspects, the duration 510 of the inactive time of the PSM cycles may be defined by the TAU timer and may be configured by base station 105. In aspects, the TAU timer duration may be in the order of minutes or hours (e.g., in this example duration 510 is 7 hours). During each PSM cycle, UE 115 may be inactive (e.g., shutdown or power down) during the inactive duration 510. Upon the expiration of the TAU timer for each inactive time of the PSM implementation, UE 115 may enter a corresponding active time (e.g., one of active time 530-532) of the PSM cycles. In the example illustrated in FIG. 3A, the active time of the PSM cycles has a duration 520, which may be in the order of seconds, minutes, or even hours. In the example illustrated in FIG. 5A, duration 520 is one hour. During the active time of the PSM cycles, UE 115 may operate in eDRX mode. Furthermore, when the set of criteria is determined to be met by UE 115, UE 115 may operate, during the active time of the PSM cycles, in eDRX mode and may implement the variant of the PSM in accordance with aspects of the present disclosure.

FIG. 5B shows a diagram illustrating an example of a variant of a PSM implementation for an active time of a PSM cycle configured for eDRX in accordance with aspects of the present disclosure. In aspects, active time 533 shown in FIG. 5B may be an active time such as one of active times 530-532 of the PSM implementation illustrated in FIG. 5A, and may have a duration 520, which in this example is one hour. As shown in FIG. 5B, UE 115 may exit the inactive time of the PSM cycle and enter the active time 533 of the PSM cycle at time 550. In this example, UE 115 may exit the PSM inactive time and enter the active time 533 in response to expiration of the TAU timer, or in response to MO data to be transmitted to base station 105. In any case, at time 550, UE 115 may enter eDRX mode in active time 533. As noted above, UE 115 may have determined that the set of criteria for implementing the variant of the PSM has been met. Therefore, in this example, active time 533 may be configured with the variant PSM in accordance with aspects of the present disclosure.

In aspects, active time 533 may be divided into five eDRX idle periods 560 (of duration 525) and five eDRX paging periods 561 (of duration 526). Each eDRX paging period 561 may comprise a PTW during which UE 115 is operable to monitor a downlink channel for paging messages from base station 105. In this example, eDRX idle periods 560 may each have a duration 525 of 11:55 minutes, and each of eDRX paging periods 561 may each have a duration 526 of 5 seconds. In the variant PSM, UE 115 may wake up into a full idle power mode in order to monitor for paging messages during each eDRX paging period 561. As such, in variant PSM, UE 115 may be powered up sufficiently to perform idle operations. Therefore, UE 115 may be reachable by page for 5 seconds during each eDRX cycle, or a total of 25 seconds during active time 533. In aspects, implementing the variant of the PSM may also include UE 115 entering a deep sleep mode during each eDRX idle period 560. As such, in the variant of the PSM, UE 115 may be powered down during eDRX idle periods 560. Therefore, UE 115 may not be reachable by page for 11:55 minutes during each eDRX cycle, or a total of 59:35 minutes during active time 533. In aspects, before each eDRX paging period, UE 115 may wake up, or exit the deep sleep mode, and may ramp up to the full idle power, such that, by the time the eDRX paging period begins, UE 115 is fully powered to monitor for paging messages from base station 105.

It should be appreciated that implementing the variant of the PSM, allows UE 115 to shut down and save power during the eDRX off cycles (e.g., eDRX idle periods), as UE 115 is powered down during these periods. On the other hand, when UE 115 is in a eDRX on cycle (e.g., a eDRX paging period or a PTW, UE 115 is powered on and performing idle operations.

With reference back to FIG. 4, during operation of wireless communications system 400, base station 105 transmits paging message 475 to UE 115 during at least one PTW of an active time of the PSM cycles. In aspects, base station 105 may be aware of the PSM configuration of UE 105. For example, in aspects, base station 105 may have configured the PSM and eDRX of UE 115, may receive the PSM and eDRX of UE 115 from another node or from UE 115. In any case, UE may be aware of when UE 115 is available to receive a paging message. In some aspects, UE 115 may optionally transmit message 480 indicating to base station 105 that UE 115 is available for a downlink message (e.g., a paging message), and/or may include the eDRX configuration of the active time of UE 115 (e.g., an indication of the location of the eDRX paging periods within the active time). In aspects, the message 480 may be transmitted when UE 115 enters an active period of a PSM cycle. In aspects, UE 115, as described above, may be configured to power up prior to the at least one PTW such that the UE is fully powered up at a beginning of the at least one PTW.

In aspects, UE 115 may receive the paging message 475 from base station 105 during at least one PTW of a eDRX paging period of an active time of a PSM cycle. In aspects, in response to receiving the paging message, UE 115 may extend the active time within which the paging message 475 was received.

Figure 6:
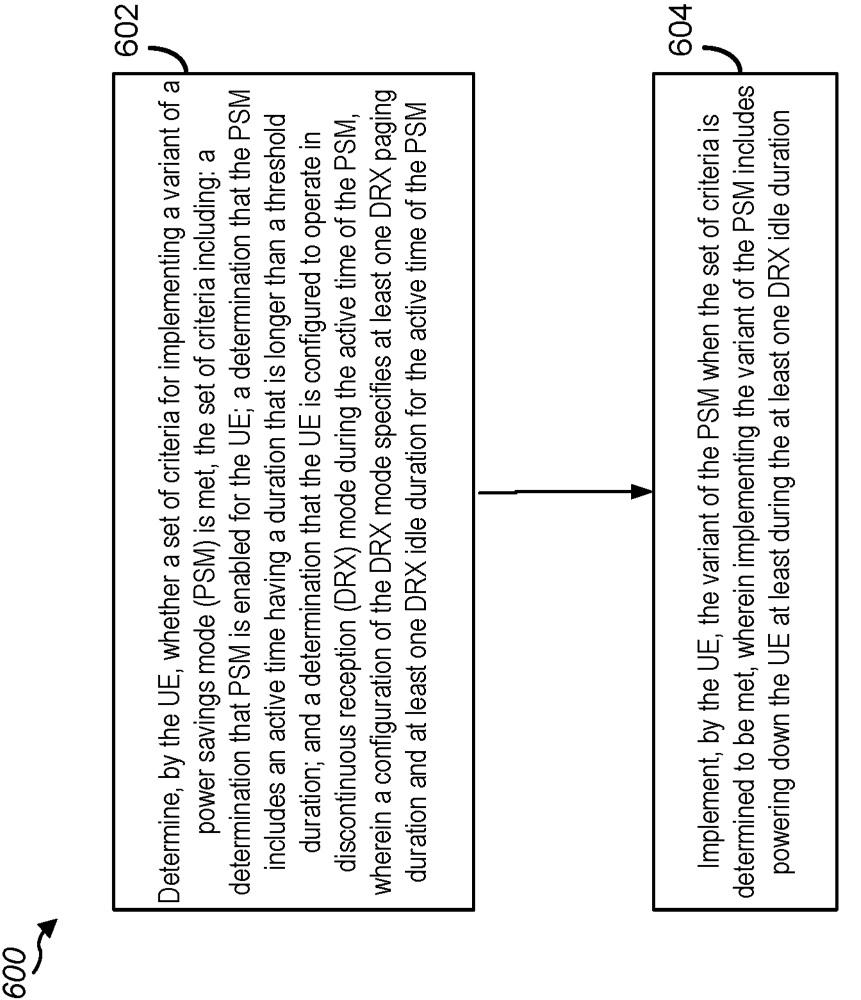
FIG. 6 is a flow chart illustrating a method of wireless communication performed by a user equipment (UE) according to some aspects of the disclosure.
Figure 7:
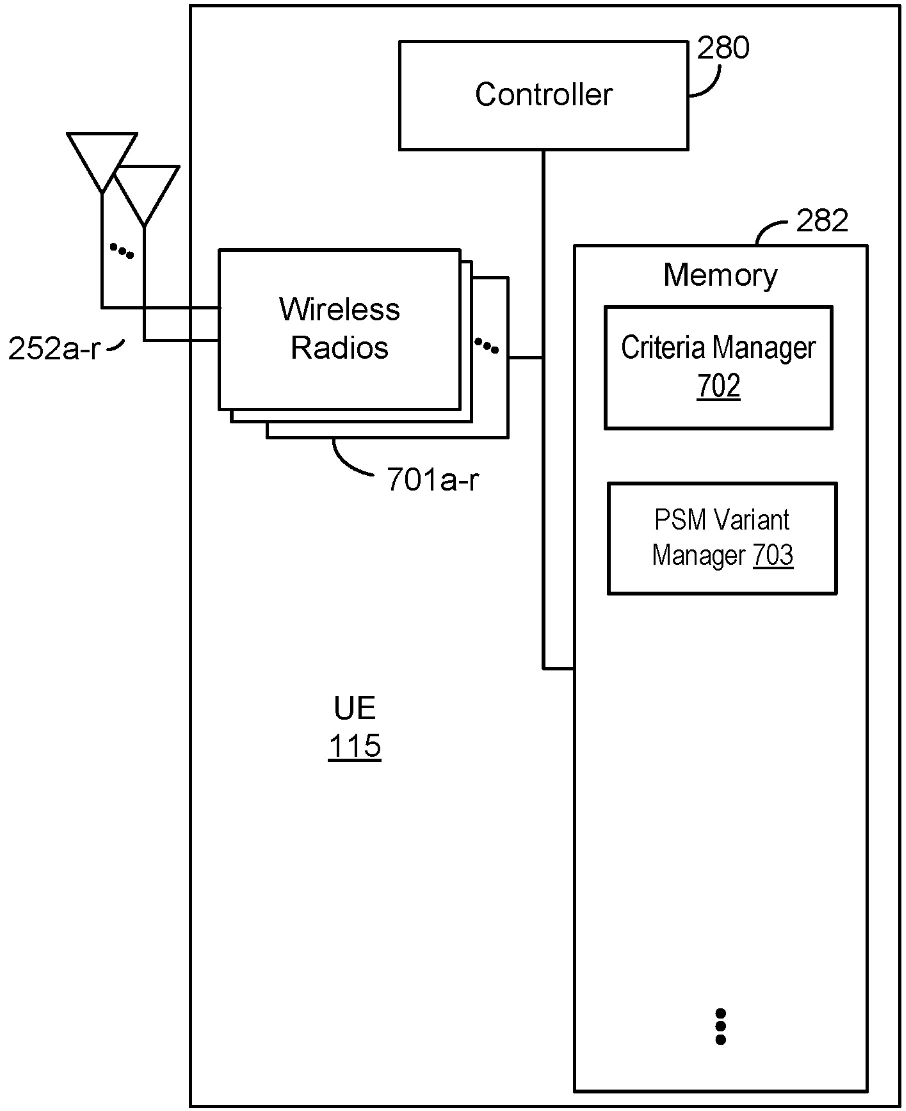
FIG. 7 is a block diagram illustrating an example of a UE according to some aspects of the disclosure.

FIG. 6 is a flow diagram illustrating an example process 600 that supports an enhanced PSM for an active time duration of a PSM with eDRX configuration in a wireless communication system according to one or more aspects of the present disclosure. Operations of the process illustrated in FIG. 6 may be performed by a UE, such as UE 115 described above with reference to FIGS. 1-5, or a UE 115 described with reference to FIG. 7. For example, example operations (also referred to as "blocks") of process 600 illustrated in FIG. 6 may enable UE 115 to support managing a sequential order for performing a deferral procedure and at least one other slot index-dependent procedure. FIG. 7 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701*a-r* and antennas 252*a-r*. Wireless radios 701*a-r* include various components and hardware, as illustrated in FIG. 2 for UE 115, including modulator/demodulators 254*a-r*, MIMO detector 256, receive processor 258, transmit processor 264, and TX MIMO processor 266.

At block 602 of process 600, a UE (e.g., UE 115) determines whether a set of criteria for implementing a variant of a PSM is met. In order to implement the functionality for such operations, UE 115, under control of controller/processor 280, executes criteria manager 702, stored in memory 282. The functionality implemented through the execution environment of criteria manager 702 allows for UE 115 to perform criteria related operations according to the various aspects herein.

In aspects, the set of criteria may include a determination of whether PSM is enabled for the UE, a determination that a configuration of the PSM includes an active time having a duration that is longer than a threshold duration, and a determination that the UE is configured to operate in eDRX mode during the active time of the PSM. In some aspects, the configuration of the eDRX mode may specify at least one eDRX paging duration and at least one eDRX idle duration for the active time of the PSM. The UE may be an IoT device.

In some aspects, the duration of the active time of the PSM is defined by a T3324 timer. In aspects, the threshold duration against which the active time duration is compared may be configurable, and may be longer than an overhead duration required to power up the UE.

At block 604, the UE implements the variant of the PSM when the set of criteria is determined to be met. In order to implement the functionality for such operations, UE 115, under control of controller/processor 280, executes PSM variant manager 703, stored in memory 282. The functionality implemented through the execution environment of PSM variant manager 703 allows for UE 115 to perform PSM variant implementation operations according to the various aspects herein. For example, UE 115 may obtain predetermined configuration specifying the set of criteria, and may determine that one or more, or in some aspects all, of the criteria in the set of criteria are met. In some aspects, UE 115 may receive a message from a network node (e.g., a base station, a control node, or another node of the network including the configuration defining the set of criteria, or including an indication that the set of criteria is met for the UE. In any case, UE 115 may implement the variant of the PSM.

In aspects, implementing the variant of the PSM may include powering down the UE at least during a part of the at least one eDRX idle duration. Powering down the UE may include powering off a modem of the UE and/or powering off an application processor of the UE.

In aspects, the at least one eDRX paging duration of the eDRX mode may include at least one PTW during which the UE is configured to receive a paging message from a base station. The UE may power up the UE prior to the at least one PTW such that the UE is fully powered up at a beginning of the at least one PTW. The UE may then receive the paging message during the at least one PTW from the base station. In these aspects, the UE may extend the active time of the PSM configuration in response to receiving the paging message during the at least one PTW.

In one or more aspects, techniques for supporting an enhanced PSM for an active time duration of a PSM with eDRX configuration in a wireless communication system may include additional aspects, such as any single aspect or any combination of aspects described below or in connection with one or more other processes or devices described elsewhere herein. In a first aspect, supporting an enhanced PSM for an active time duration of a PSM with eDRX configuration in a wireless communication system may include an apparatus configured to determine whether a set of criteria for implementing a variant of a PSM is met. In the first aspect, the set of criteria includes a determination of whether PSM is enabled for the UE, a determination that a configuration of the PSM includes an active time having a duration that is longer than a threshold duration, or a determination that the UE is configured to operate in eDRX mode during the active time of the PSM. The configuration of the eDRX mode specifies at least one eDRX paging duration and at least one eDRX idle duration for the active time of the PSM. The apparatus is also configured to implement the variant of the PSM when the set of criteria is determined to be met. In this aspect, implementing the variant of the PSM includes powering down the UE at least during a part of the at least one eDRX idle duration. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the at least one eDRX paging duration of the eDRX mode includes at least one PTW during which the UE is configured to receive a paging message from a base station.

In a third aspect, alone or in combination with one or more of the first aspect or the second aspect, the techniques of the first aspect include powering up the UE prior to the at least one PTW such that the UE is fully powered up at a beginning of the at least one PTW.

In a fourth aspect, alone or in combination with the third aspect, the techniques of the third aspect include receiving, by the UE, the paging message during the at least one PTW from the base station.

In a fifth aspect, alone or in combination with the fourth aspect, the techniques of the fourth aspect include extending the active time of the PSM configuration in response to receiving the paging message during the at least one PTW.

In a sixth aspect, alone or in combination with one or more of the first aspect through the fifth aspect, powering down the UE includes powering off a modem of the UE.

In a seventh aspect, alone or in combination with the sixth aspect, powering down the UE includes powering off an application processor of the UE.

In an eighth aspect, alone or in combination with one or more of the first aspect through the seventh aspect, the duration of the active time of the PSM is defined by a T3324 timer.

In a ninth aspect, alone or in combination with one or more of the first aspect through the eighth aspect, the threshold duration is configurable and is longer than an overhead duration required to power up the UE.

In a tenth aspect, alone or in combination with one or more of the first aspect through the ninth aspect, determining whether the set of criteria for implementing a variant of the PSM is met includes receiving a set of configuration from a network node.

In an eleventh aspect, alone or in combination with one or more of the first aspect through the tenth aspect, the UE is an IoT device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a graphics processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), flash memory, phase change memory, electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items (for example, prefaced by "at least one of") indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

determining, by the UE, whether a set of criteria for implementing a variant of a power saving mode (PSM) is met, the set of criteria including:

a determination of whether PSM is enabled for the UE;

a determination that a configuration of the PSM includes an active time having a duration that is longer than a threshold duration; and a determination that the UE is configured to operate in extended discontinuous reception (eDRX) mode during the active time of the PSM, wherein a configuration of the eDRX mode specifies at least one eDRX paging duration and at least one eDRX idle duration for the active time of the PSM; and implementing, by the UE, the variant of the PSM when the set of criteria is determined to be met, wherein implementing the variant of the PSM includes entering, by the UE, a deep sleep mode at least during a part of the at least one eDRX idle duration for the active time of the PSM, wherein the deep sleep mode is associated with a power state less than a power state associated with a sleep mode used by the UE during the eDRX mode when the set of criteria is not met.

2. The method of claim 1, wherein the at least one eDRX paging duration of the eDRX mode includes at least one paging time window (PTW) during which the UE is configured to receive a paging message from a network entity.

3. The method of claim 2, further comprising:

powering up the UE prior to the at least one PTW such that the UE is fully powered up at a beginning of the at least one PTW.

4. The method of claim 3, further comprising:

receiving, by the UE, the paging message during the at least one PTW from the network entity.

5. The method of claim 4, further comprising:

extending the active time of the PSM configuration in response to receiving the paging message during the at least one PTW.

6. The method of claim 1, wherein powering down the UE includes one or more of:

powering off a modem of the UE; or powering off an application processor of the UE.

7. The method of claim 1, wherein the duration of the active time of the PSM is defined by a T3324 timer.

8. The method of claim 1, wherein the threshold duration is configurable and is longer than an overhead duration required to power up the UE.

9. The method of claim 1, wherein determining whether the set of criteria for implementing a variant of the PSM is met includes receiving a set of configuration from a network node.

10. The method of claim 1, wherein the UE is an Internet of Things (IoT) device.

11. A user equipment (UE) comprising:

at least one processor; and a memory coupled with the at least one processor and storing processor-readable code that, when executed by the at least one processor, is configured to perform operations including:

determining, by the UE, whether a set of criteria for implementing a variant of a power saving mode (PSM) is met, the set of criteria including:

a determination of whether PSM is enabled for the UE;

a determination that a configuration of the PSM includes an active time having a duration that is longer than a threshold duration; and a determination that the UE is configured to operate in extended discontinuous reception (eDRX) mode during the active time of the PSM, wherein a configuration of the eDRX mode specifies at least one eDRX paging duration and at least one eDRX idle duration for the active time of the PSM; and implementing, by the UE, the variant of the PSM when the set of criteria is determined to be met, wherein implementing the variant of the PSM includes entering, by the UE, a deep sleep mode at least during a part of the at least one eDRX idle duration for the active time of the PSM, wherein the deep sleep mode is associated with a power state less than a power state associated with a sleep mode used by the UE during the eDRX mode when the set of criteria is not met.

12. The UE of claim 11, wherein the at least one eDRX paging duration of the eDRX mode includes at least one paging time window (PTW) during which the UE is configured to receive a paging message from a network entity.

13. The UE of claim 12, the operations further comprising:

powering up the UE prior to the at least one PTW such that the UE is fully powered up at a beginning of the at least one PTW.

14. The UE of claim 13, the operations further comprising:

receiving, by the UE, the paging message during the at least one PTW from the network entity.

15. The UE of claim 14, the operations further comprising:

extending the active time of the PSM configuration in response to receiving the paging message during the at least one PTW.

16. The UE of claim 11, wherein powering down the UE includes one or more of:

powering off a modem of the UE; or powering off an application processor of the UE.

17. The UE of claim 11, wherein the duration of the active time of the PSM is defined by a T3324 timer.

18. The UE of claim 11, wherein the threshold duration is configurable and is longer than an overhead duration required to power up the UE.

19. The UE of claim 11, wherein determining whether the set of criteria for implementing a variant of the PSM is met includes receiving a set of configuration from a network node.

20. The UE of claim 11, wherein the UE is an Internet of Things (IoT) device.

21. A non-transitory computer-readable medium storing instructions that, when executed by a processor, cause the processor to perform operations comprising:

determining, by a user equipment (UE), whether a set of criteria for implementing a variant of a power saving mode (PSM) is met, the set of criteria including:

a determination of whether PSM is enabled for the UE;

a determination that a configuration of the PSM includes an active time having a duration that is longer than a threshold duration; and a determination that the UE is configured to operate in extended discontinuous reception (eDRX) mode during the active time of the PSM, wherein a configuration of the eDRX mode specifies at least one eDRX paging duration and at least one eDRX idle duration for the active time of the PSM; and implementing, by the UE, the variant of the PSM when the set of criteria is determined to be met, wherein implementing the variant of the PSM includes entering, by the UE, a deep sleep mode at least during a part of the at least one eDRX idle duration for the active time of the PSM, wherein the deep sleep mode is associated with a power state less than a power state associated with a sleep mode used by the UE during the eDRX mode when the set of criteria is not met.

22. An apparatus configured for wireless communication, the apparatus comprising:

means for determining, by a user equipment (UE), whether a set of criteria for implementing a variant of a power saving mode (PSM) is met, the set of criteria including:

a determination of whether PSM is enabled for the UE;

a determination that a configuration of the PSM includes an active time having a duration that is longer than a threshold duration; and a determination that the UE is configured to operate in extended discontinuous reception (eDRX) mode during the active time of the PSM, wherein a configuration of the eDRX mode specifies at least one eDRX paging duration and at least one eDRX idle duration for the active time of the PSM; and means for implementing, by the UE, the variant of the PSM when the set of criteria is determined to be met, wherein the means for implementing the variant of the PSM include means for entering, by the UE, a deep sleep mode at least during a part of the at least one eDRX idle duration for the active time of the PSM, wherein the deep sleep mode is associated with a power state less than a power state associated with a sleep mode used by the UE during the eDRX mode when the set of criteria is not met.

23. The apparatus of claim 22, wherein the at least one eDRX paging duration of the eDRX mode includes at least one paging time window (PTW) during which the UE is configured to receive a paging message from a network entity.

24. The apparatus of claim 23, further comprising: means for powering up the UE prior to the at least one PTW such that the UE is fully powered up at a beginning of the at least one PTW.

25. The apparatus of claim 24, further comprising: means for receiving, by the UE, the paging message during the at least one PTW from the network entity.

26. The apparatus of claim 25, further comprising: means for extending the active time of the PSM configuration in response to receiving the paging message during the at least one PTW.

27. The apparatus of claim 22, wherein the means for powering down the UE include one or more of:

means for powering off a modem of the UE; or means for powering off an application processor of the UE.

28. The apparatus of claim 22, wherein the duration of the active time of the PSM is defined by a T3324 timer.

29. The apparatus of claim 22, wherein the threshold duration is configurable and is longer than an overhead duration required to power up the UE.

30. The apparatus of claim 22, wherein the means for determining whether the set of criteria for implementing a variant of the PSM is met include means for receiving a set of configuration from a network node.

* * * * *